United States Patent
Johnson

(10) Patent No.: US 10,719,091 B2
(45) Date of Patent: Jul. 21, 2020

(54) TEMPERATURE CONTROL

(71) Applicant: Intellistat Ltd., Perthshire (GB)

(72) Inventor: Robert Johnson, Perthshire (GB)

(73) Assignee: Intellistat Ltd., Perthshire (GB)

( * ) Notice: Subject to any disclaimer, the term of this patent is extended or adjusted under 35 U.S.C. 154(b) by 0 days.

(21) Appl. No.: 14/891,286

(22) PCT Filed: May 13, 2014

(86) PCT No.: PCT/GB2014/051465
§ 371 (c)(1),
(2) Date: Nov. 13, 2015

(87) PCT Pub. No.: WO2014/184541
PCT Pub. Date: Nov. 20, 2014

(65) Prior Publication Data
US 2016/0109892 A1  Apr. 21, 2016

(30) Foreign Application Priority Data
May 13, 2013  (GB) .................................. 1308560.0

(51) Int. Cl.
*G05D 23/19* (2006.01)
*G05B 15/02* (2006.01)

(52) U.S. Cl.
CPC .......... *G05D 23/1902* (2013.01); *G05B 15/02* (2013.01)

(58) Field of Classification Search
CPC .................................................. G05D 23/1902
(Continued)

(56) References Cited

U.S. PATENT DOCUMENTS 5,586,061 A  * 12/1996 Williams ............... G01K 15/00
374/E15.001
7,925,389 B2 *  4/2011 Bradicich .............. G01N 25/18
374/100
(Continued)

FOREIGN PATENT DOCUMENTS

DE     197 08 400 A1    9/1998
EP        2302344 A2 *  3/2011  ............... G01K 7/20

OTHER PUBLICATIONS

Bo Yan, An apparatus for measuring temperature and method thereof, Sep. 13, 2010, European Patent Application.*

*Primary Examiner* — James J Lee
*Assistant Examiner* — Christopher W Carter
(74) *Attorney, Agent, or Firm* — Owens Law Firm, PC

(57) ABSTRACT

A method for use in temperature control includes a step of associating a first setting of an adjustable device with a first temperature. The method may include a step of associating a second setting of the adjustable device with a second temperature. The method may include a step of determining a set-point temperature from a set-point setting of the adjustable device, the first and second settings of the adjustable device, and the first and second temperatures. The first and second temperatures may define a temperature range over which temperature is to be controlled. Such a method may allow a user to select or define a temperature range over which an object, system or environment is to be controlled from within a maximum operating temperature range of a temperature sensor. Such a method may allow a user to select or define a set-point temperature from within the selected temperature range.

6 Claims, 5 Drawing Sheets

(58) Field of Classification Search
USPC .......................................................... 700/300
See application file for complete search history.

(56) References Cited

U.S. PATENT DOCUMENTS

| | | | |
|---|---|---|---|
| 2003/0163225 A1* | 8/2003 | Hanson | G05D 23/1902 700/299 |
| 2005/0236394 A1* | 10/2005 | Boehm | F24C 14/00 219/494 |
| 2006/0219705 A1 | 10/2006 | Beier et al. | |
| 2007/0158444 A1* | 7/2007 | Naujok | G05D 23/1902 236/91 D |
| 2007/0291817 A1 | 12/2007 | Bradicich et al. | |
| 2008/0066661 A1* | 3/2008 | Berkenkoetter | F24C 7/087 110/162 |
| 2010/0045951 A1* | 2/2010 | Martens | G01K 7/42 355/30 |

\* cited by examiner

TEMPERATURE CONTROL

FIELD OF INVENTION

The present invention relates to a method and an apparatus for use in temperature control. The method and apparatus may be used for controlling the temperature of an object, system or environment of any kind in conjunction with a temperature sensor of any kind.

BACKGROUND OF INVENTION

Thermostats may be used for sensing the temperature of a system or an environment and for controlling a plant for heating and/or cooling the system or the environment according to the sensed temperature so as to maintain the temperature of the system or the environment near to a desired set-point temperature.

Known types of thermostats include mechanical thermostats and digital electronic thermostats. Known thermostats are generally only calibrated for a predetermined temperature range and/or are generally only configured for use with a predetermined temperature sensor. Calibration of mechanical thermostats is relatively difficult and generally requires specialist equipment within a factory environment. Furthermore, mechanical thermostats may suffer from a drift in accuracy as a result of ageing. In the case of a digital electronic thermostat, calibration data for the predetermined temperature sensor may be stored in a memory. The operating temperature range of known thermostats is generally fixed and cannot be readily re-defined according to the temperature control application or according to the temperature sensor or type of temperature sensor.

SUMMARY OF INVENTION

According to an aspect of the present invention there is provided a method for use in temperature control.

The method may comprise associating a first setting of an adjustable device with a first temperature signal value measured at a first temperature.

The method may comprise associating a second setting of the adjustable device with a second temperature signal value measured at a second temperature.

The method may comprise determining a set-point temperature signal value from a set-point setting of the adjustable device, the first and second settings of the adjustable device, and the first and second temperature signal values.

The method may comprise using a temperature sensor to measure the first temperature signal value.

The method may comprise using the temperature sensor to measure the second temperature signal value.

The method may comprise:

associating a first setting of an adjustable device with a first temperature signal value measured using a temperature sensor at a first temperature;

associating a second setting of the adjustable device with a second temperature signal value measured using the temperature sensor at a second temperature; and determining a set-point temperature signal value from a set-point setting of the adjustable device, the first and second settings of the adjustable device, and the first and second temperature signal values.

The temperature signal may be representative of the temperature sensed by the temperature sensor. For example, the temperature signal may be proportional to temperature sensed by the temperature sensor. The temperature signal may be an analogue temperature signal. The temperature signal may be an electrical signal such as a voltage or a current.

The first temperature signal value may be representative of a first temperature to which the temperature sensor is exposed.

The second temperature signal value may be representative of a second temperature to which the temperature sensor is exposed.

The set-point temperature signal value may be representative of a set-point temperature to which the temperature sensor is to be exposed.

The method may comprise determining a relative or absolute temperature corresponding to at least one of the first, second and set-point temperature signal values. The method may comprise using calibration data or a calibration function to determine a relative or absolute temperature corresponding to at least one of the first, second and set-point temperature signal values.

The first temperature may define a minimum set-point temperature. The second temperature may define a maximum set-point temperature. The first and second temperatures may define a temperature range over which temperature is to be controlled.

The method may allow a user or operator to select or define a temperature range over which an object, system or environment is to be controlled from within an operating temperature range of the temperature sensor. The operating temperature range of the temperature sensor may, for example, be defined as the temperature range over which the temperature sensor senses temperature with a predetermined degree of accuracy.

The method may allow a user or operator to select or define a temperature range over which an object, system or environment is to be controlled from within a maximum operating temperature range of the temperature sensor.

The method may allow a user or operator to select or define a temperature range over which an object, system or environment is to be controlled using a single adjustable device. Moreover, the method allows the same adjustable device to be used for selecting a set-point temperature within the selected or defined temperature range over which the object, system or environment is to be controlled.

The method may allow a user or operator to select or define a temperature range over which the object, system or environment is to be controlled using an adjustable device including but not limited to, a potentiometer, an encoder, a slider, a dial, a keyboard, and a touch screen.

The method may comprise associating a further first setting of the adjustable device with a further first temperature signal value measured using the temperature sensor at a further first temperature.

The method may comprise associating a further second setting of the adjustable device with a further second temperature signal value measured using the temperature sensor at a further second temperature.

The method may comprise determining a further set-point temperature signal value from a further corresponding set-point setting of the adjustable device, the further first and second settings of the adjustable device, and the further first and second temperature signal values. Such a method may be used to repeatedly define the temperature range over which an object, system or environment is to be controlled so as to at least partially reduce the effects of temperature sensor drift, for example drift due to ageing or drift caused by environmental changes.

Such a method may be used to re-define the temperature range over which an object, system or environment is to be controlled according to the particular application. As such, the method may be used to re-define the temperature range over which the object, system or environment is to be controlled at the time or point of use.

Such a method may be used with any kind of temperature sensor. Such a method may be regarded as a universal method of temperature control.

Such a method may be of use in the control of the temperature of any kind of environment. The method may be of use in the control of the temperature of a living environment, an office environment, a manufacturing environment or an environment internal to or in proximity to a heating or cooling system.

The method may be of use in the control of the temperature of a heating system. The method may be of use in the control of temperature in a heater, an oven, a grill, a bath, a furnace, a gas turbine, a motor, an engine such as an internal combustion engine, a diesel engine, a jet engine, a rocket, or the like.

The method may be of use in the control of the temperature of a cooling system. The method may be of use in the control of temperature in a fridge, a freezer, an air conditioning system, unit or the like.

The method may be of use in the control of temperature in catering equipment. The method may be of use in the control of the temperature of a system or appliance for warming, grilling, baking or cooking food. The method may be of use in the control of the temperature of a system or appliance for cooling food such as a fridge, a freezer or the like.

The method may be of use in the control of the temperature of a system. The method may be of use in the control of the temperature of one or more components of a system.

The method may be of use in the control of the temperature of an object.

The method may be of use in the control of the temperature of an object, system or environment across a narrow or a broad temperature range defined within an operating temperature range of a temperature sensor.

The method may be of use in the control of the temperature of an object, system or environment across a narrow or a broad temperature range defined within the maximum operating temperature range of a temperature sensor.

The method may be of use in the control of the temperature of an object, system or environment between temperatures from cryogenic temperatures to temperatures present in a furnace or a jet engine or the like.

Such a method may allow the set-point temperature signal value to be set to a high resolution or a high degree of accuracy determined by the resolution with which the adjustable device may be adjusted.

The method may comprise storing the first and second settings of the adjustable device together with the corresponding first and second temperature signal values in a look-up table.

The method may comprise storing the first and second settings of the adjustable device together with the corresponding first and second temperature signal values in a memory.

The method may comprise using interpolation to determine the set-point temperature signal value from the set-point setting of the adjustable device, the first and second settings of the adjustable device, and the first and second temperature signal values.

The method may comprise using linear interpolation to determine the set-point temperature signal value from the set-point setting of the adjustable device, the first and second settings of the adjustable device, and the first and second temperature signal values.

The first setting of the adjustable device may comprise a minimum setting of the adjustable device.

The second setting of the adjustable device may comprise a maximum setting of the adjustable device.

The method may comprise using the temperature sensor to measure the first temperature signal value when the temperature sensor is at the first temperature.

The method may comprise using the temperature sensor to measure the second temperature signal value when the temperature sensor is at the second temperature.

The method may comprise:
adjusting the setting of the adjustable device to the first setting;
heating and/or cooling an object, a system or an environment to which the temperature sensor is exposed to the first temperature; and
using the temperature sensor to measure the first temperature signal value.

The method may comprise:
adjusting the setting of the adjustable device to the second setting;
heating and/or cooling an object, a system or an environment to which the temperature sensor is exposed to the second temperature; and
using the temperature sensor to measure the second temperature signal value.

The method may comprise manually adjusting the adjustable device to at least one of the first setting, the second setting and the set-point setting.

The method may comprise confirming that the temperature sensor is at the first temperature before measuring the first temperature signal value from the temperature sensor.

The method may comprise confirming that the temperature sensor is at the second temperature before measuring the second temperature signal value from the temperature sensor.

Confirming that the temperature sensor is at the first or second temperature may comprise:
using a calibrated temperature sensor to monitor the temperature of an object, a system or an environment to which the temperature sensor is exposed; and
heating and/or cooling the object, the system or the environment until the temperature of the object, the system or the environment measured using the calibrated temperature sensor is at the first or second temperature.

The method may comprise measuring the first temperature signal value from the temperature sensor in response to a first manually provided stimulus. For example, the method may comprise measuring the first temperature signal value from the temperature sensor in response to operation of a manually operated control device.

The method may comprise measuring the second temperature signal value from the temperature sensor in response to a second manually provided stimulus. For example, the method may comprise measuring the second temperature signal value from the temperature sensor in response to operation of the manually operated control device.

The method may comprise heating and/or cooling an object, system or environment to which the temperature sensor is exposed until a temperature signal value measured by the temperature sensor reaches the set-point temperature signal value.

The method may comprise using proportional, integral and/or derivative control to control the heating and/or cooling of the object, the system or the environment.

The temperature sensor may comprise at least one of a thermometer, a thermocouple, a resistance temperature detector (RTD), a thermistor, and a pyrometer.

The method may comprise locating a further temperature sensor at a different position to the temperature sensor at, on, adjacent to, or within the object, system or environment. For example, the method may comprise locating the further temperature sensor at a centre of the object, system or environment to which the temperature sensor is exposed.

The further temperature sensor may comprise a calibrated temperature sensor.

The method may comprise heating and/or cooling the object, the system or environment until a temperature measured using the further temperature sensor reaches a predetermined temperature.

Such a method may allow the temperature at the further position to be accurately controlled. For example, such a method may allow the temperature at a centre position within a heating and/or cooling chamber to be accurately controlled even when the temperature sensor with which the chamber is fitted on manufacture is located at, adjacent or within a wall of the chamber. Such a method may allow the absolute temperature at the further position to be accurately controlled.

Such a method may allow the temperature within an object to be accurately controlled during heating and/or cooling of the object, for example during heating and/or cooling of the object within a heating and/or cooling chamber. Such a method may allow the absolute temperature within the object to be accurately controlled.

The method may comprise determining a temperature offset or difference between a temperature measured using the temperature sensor and a temperature measured at or around the same time using the further temperature sensor.

The method may comprise removing the further temperature sensor from the object, system or environment to which the temperature sensor is exposed after determining the temperature offset or difference.

The method may comprise storing the temperature offset or difference.

The method may comprise:
measuring a third temperature using the temperature sensor; and
using the third temperature and the stored temperature offset or difference to determine or infer a temperature at the further position.

The method may comprise heating and/or cooling the object, system or environment until the determined or inferred temperature at the further position reaches a desired temperature.

The method may comprise ceasing to heat or cool the object, system or environment when the determined or inferred temperature at the further position reaches a desired temperature.

Such a method may allow the temperature at the further position to be accurately controlled. For example, such a method may allow the temperature at a centre position within a heating and/or cooling chamber to be accurately controlled even when the temperature sensor with which the chamber is fitted on manufacture is located at, adjacent or within a wall of the chamber.

Such a method may serve as a method of calibrating the temperature sensor so as to provide accurate absolute temperature control at the further position after removal of the further temperature sensor from the further position.

The method may comprise re-calibrating the temperature sensor at different times. This may allow for changes, drift or ageing of the configuration of the object, system or environment, or of the heating and/or cooling plant used to heat and/or cool the object, system or environment, or of the temperature sensor itself over time. The method may comprise locating the further temperature sensor at the further position for each re-calibration of the temperature sensor, and removing the further temperature sensor from the further position after each re-calibration.

The method may comprise determining a temperature offset or difference between the temperature measured using the temperature sensor and the temperature measured at or around the same time using the further temperature sensor for each of a plurality of predetermined temperatures.

The method may comprise storing each temperature offset or difference together with the corresponding temperature measured using the temperature sensor.

The method may comprise:
measuring a third temperature using the temperature sensor; and
using the third temperature and the corresponding stored temperature offset or difference to determine or infer a temperature at the further position.

The method may comprise using interpolation to determine or infer the temperature at the further position.

Measuring and storing a different temperature offset or difference for each temperature measured using the temperature sensor may provide a more accurate estimate of the temperature at the further position over a temperature range.

The method may comprise associating a further first setting of the adjustable device with a further first temperature signal value measured using a further temperature sensor at a further first temperature.

The method may comprise associating a further second setting of the adjustable device with a further second temperature signal value measured using the further temperature sensor at a further second temperature.

The method may comprise determining a further set-point temperature signal value from a further corresponding set-point setting of the adjustable device, the further first and second settings of the adjustable device, and the further first and second temperature signal values.

Such a method may be used for temperature control using multiple temperature sensors, where each temperature sensor is used to sense the temperature of a different object, to sense the temperature in a different environment or zone or to sense the temperature of a different system or component. Such a method may be used to define different temperature control ranges for different objects, to define different temperature control ranges in different environments or zones, or to define different temperature ranges for different systems or components.

The method may comprise associating a further first setting of the adjustable device with a further first temperature signal value measured using the temperature sensor at a further first temperature.

The method may comprise associating a further second setting of the adjustable device with a further second temperature signal value measured using the temperature sensor at a further second temperature.

Such a method may permit the definition of multiple temperature control ranges for a single temperature sensor.

The method may comprise storing the temperature control ranges in a memory.

The method may comprise selecting a different temperature control range at a different time.

The method may comprise determining a further set-point temperature signal value from a further corresponding set-point setting of the adjustable device, the further first and second settings of the adjustable device, and the further first and second temperature signal values.

Such a method may permit the setting of a different set-point temperature within a corresponding temperature control range at a different time.

Such a method may be useful where a heating or cooling system or device is used for different heating or cooling applications at different times.

It should be understood that one or more features of one aspect may apply alone or in any combination to any other aspect.

According to an aspect of the present invention there is provided a method for controlling a temperature of an object, system or environment, comprising:

associating a first setting of an adjustable device with a first temperature signal value measured using a temperature sensor at a first temperature;

associating a second setting of the adjustable device with a second temperature signal value measured using the temperature sensor at a second temperature;

determining a set-point temperature signal value from a set-point setting of the adjustable device, the first and second settings of the adjustable device, and the first and second temperature signal values; and heating and/or cooling an object, system or environment to which the temperature sensor is exposed until a temperature signal value measured by the temperature sensor reaches the set-point temperature signal value.

It should be understood that one or more features of one aspect may apply alone or in any combination to any other aspect.

According to an aspect of the invention there is provided an apparatus for use in temperature control.

The apparatus may comprise an adjustable device.

The apparatus may comprise a processor.

The processor may be configured for communication with the adjustable device.

The processor may be configured to associate a first setting of the adjustable device with a first temperature signal value measured at a first temperature.

The processor may be configured to associate a second setting of the adjustable device with a second temperature signal value measured at a second temperature.

The processor may be configured to determine a set-point temperature signal value from a set-point setting of the adjustable device, the first and second settings of the adjustable device, and the first and second temperature signal values.

The processor may be configured for communication with a temperature sensor.

The first temperature signal value may be measured by a temperature sensor.

The second temperature signal value may be measured by the temperature sensor.

The apparatus may comprise:
an adjustable device; and
a processor configured for communication with the adjustable device and a temperature sensor, wherein the processor is configured to:

associate a first setting of the adjustable device with a first temperature signal value measured by the temperature sensor at a first temperature;

associate a second setting of the adjustable device with a second temperature signal value measured by the temperature sensor at a second temperature; and determine a set-point temperature signal value from a set-point setting of the adjustable device, the first and second settings of the adjustable device, and the first and second temperature signal values.

The adjustable device may comprise a potentiometer, an encoder, a slider, a dial, a keyboard, a touch screen or the like.

The apparatus may comprise a memory.

The processor may be configured for communication with the memory.

The processor may be configured to store the first and second settings of the adjustable device together with the corresponding first and second temperature signal values in the memory.

The apparatus may comprise a manually operated binary control device.

The processor may be configured for communication with the binary control device.

The processor may be configured to determine at least one of the first and second settings of the adjustable device in response to operation of the binary control device.

The processor may be configured to determine at least one of the first and second settings of the adjustable device in response to operation of the binary control device.

The processor may be configured to control a plant so as to heat and/or cool the object, system or environment to which the temperature sensor is exposed in response to operation of the binary control device.

The processor may be configured to measure the first and second temperature signal values from the temperature sensor in response to operation of the binary control device.

The binary control device may comprise a switch, a button, a keyboard, a touch screen or the like.

The apparatus may comprise an indicator. The processor may be configured for communication with the indicator.

The processor may be configured to operate the indicator so as to visually confirm when the processor has determined the first and/or second settings of the adjustable device.

The processor may be configured to operate the indicator so as to visually confirm when the processor has determined the first and/or second settings of the adjustable device.

The processor may be configured to operate the indicator so as to visually confirm when the processor is controlling the plant so as to heat and/or cool the object, system or environment to which the temperature sensor is exposed.

The processor may be configured to operate the indicator so as to visually confirm when the processor has measured the first and/or second temperature signal values from the temperature sensor.

The indicator may comprise a light emitting diode (LED) or a display such as a digital display.

The processor may be configured for communication with a plant for heating and/or cooling an object, system or environment to which the temperature sensor is exposed.

The processor may be configured to control the plant so as to control the temperature of the object, system or environment to which the temperature sensor is exposed until a temperature signal value measured by the temperature sensor reaches the set-point temperature signal value.

The apparatus may comprise a power switching device such as a relay or a solid state power switching device such as a power transistor or the like for controlling the supply of power to the plant.

It should be understood that one or more features of one aspect may apply alone or in any combination to any other aspect.

According to an aspect of the invention there is provided a thermostat.

The thermostat may comprise:
the apparatus for use in temperature control; and
a temperature sensor.

The thermostat may comprise:
a temperature sensor;
an adjustable device; and
a processor configured for communication with the adjustable device and the temperature sensor, wherein the processor is configured to:
associate a first setting of the adjustable device with a first temperature signal value measured by the temperature sensor at a first temperature;
associate a second setting of the adjustable device with a second temperature signal value measured by the temperature sensor at a second temperature; and
determine a set-point temperature signal value from a set-point setting of the adjustable device, the first and second settings of the adjustable device, and the first and second temperature signal values.

It should be understood that one or more features of one aspect may apply alone or in any combination to any other aspect.

According to an aspect of the invention there is provided a temperature control system.

The temperature control system may comprise:
the apparatus for use in temperature control;
a temperature sensor; and
a plant for heating and/or cooling the apparatus, system or environment to which the temperature sensor is exposed.

The plant may comprise a heating system. The plant may comprise a heater, an oven, a grill, a bath, a furnace, a gas turbine, a motor, an engine such as an internal combustion engine, a diesel engine, a jet engine, a rocket, or the like.

The plant may comprise a cooling system. The plant may comprise a fridge, a freezer, an air conditioning system, unit or the like.

The plant may comprise catering equipment. The plant may comprise a system or appliance for warming, grilling, baking or cooking food. The plant may comprise a system or appliance for cooling food such as a fridge, a freezer or the like.

The temperature control system may comprise:
a temperature sensor;
a plant for heating and/or cooling the object, system or environment to which the temperature sensor is exposed;
an adjustable device; and
a processor configured for communication with the adjustable device and the temperature sensor, wherein the processor is configured to:
associate a first setting of the adjustable device with a first temperature signal value measured by the temperature sensor at a first temperature;
associate a second setting of the adjustable device with a second temperature signal value measured by the temperature sensor at a second temperature; and
determine a set-point temperature signal value from a set-point setting of the adjustable device, the first and second settings of the adjustable device, and the first and second temperature signal values.

It should be understood that one or more features of one aspect may apply alone or in any combination to any other aspect.

According to an aspect of the present invention there is provided a method for use in temperature control.

The method may comprise associating a first setting of an adjustable device with a first temperature. The method may comprise associating the first setting of the adjustable device with a first temperature signal value. The first temperature signal value may be representative of the first temperature. The method may comprise a using a temperature sensor to measure the first temperature signal value at the first temperature.

The method may comprise associating a second setting of the adjustable device with a second temperature. The method may comprise associating the second setting of the adjustable device with a second temperature signal value. The second temperature signal value may be representative of the second temperature. The method may comprise a using a temperature sensor to measure the second temperature signal value at the second temperature.

The method may comprise determining a set-point temperature from a set-point setting of the adjustable device, the first and second settings of the adjustable device, and the first and second temperatures.

The method may comprise:
associating a first setting of an adjustable device with a first temperature;
associating a second setting of the adjustable device with a second temperature; and
determining a set-point temperature from a set-point setting of the adjustable device, the first and second settings of the adjustable device, and the first and second temperatures.

It should be understood that one or more features of one aspect may apply alone or in any combination to any other aspect.

According to an aspect of the present invention there is provided a method for controlling a temperature of an object, system or environment, comprising:
associating a first setting of an adjustable device with a first temperature;
associating a second setting of the adjustable device with a second temperature;
determining a set-point temperature from a set-point setting of the adjustable device, the first and second settings of the adjustable device, and the first and second temperatures; and
heating and/or cooling an object, system or environment to which the temperature sensor is exposed until a temperature signal value measured by the temperature sensor reaches the set-point temperature.

The method may comprise associating the first setting of the adjustable device with a first temperature signal value. The first temperature signal value may be representative of the first temperature. The method may comprise a using a temperature sensor to measure the first temperature signal value at the first temperature.

The method may comprise associating the second setting of the adjustable device with a second temperature signal value. The second temperature signal value may be representative of the second temperature. The method may comprise a using a temperature sensor to measure the second temperature signal value at the second temperature.

The method may comprise determining a set-point temperature signal value from a set-point setting of the adjustable device, the first and second settings of the adjustable device, and the first and second temperature signal values.

The method may comprise heating and/or cooling an object, system or environment to which the temperature sensor is exposed until a temperature signal value measured by the temperature sensor reaches the set-point temperature signal value.

It should be understood that one or more features of one aspect may apply alone or in any combination to any other aspect.

According to an aspect of the present invention there is provided an apparatus for use in temperature control.

The apparatus may comprise an adjustable device.

The apparatus may comprise a processor.

The processor may be configured for communication with the adjustable device.

The processor may be configured to associate a first setting of the adjustable device with a first temperature.

The processor may be configured to associate a second setting of the adjustable device with a second temperature.

The processor may be configured to determine a set-point temperature from a set-point setting of the adjustable device, the first and second settings of the adjustable device, and the first and second temperatures.

The processor may be configured for communication with a temperature sensor.

The apparatus may comprise:
an adjustable device; and
a processor configured for communication with the adjustable device, wherein the processor is configured to:
associate a first setting of the adjustable device with a first temperature;
associate a second setting of the adjustable device with a second temperature; and
determine a set-point temperature from a set-point setting of the adjustable device, the first and second settings of the adjustable device, and the first and second temperatures.

It should be understood that one or more features of one aspect may apply alone or in any combination to any other aspect.

According to an aspect of the present invention there is provided a method for use in temperature control. The method may be of use in the control of the temperature of an object, system or environment. For example, the method may be of use in the control of the temperature of a chamber of a heating and/or cooling apparatus or an object located within a chamber of a heating and/or cooling apparatus.

The method may comprise measuring a first temperature of the object, system or environment using a first temperature sensor located at a first position at a first time.

The first temperature sensor may, for example, be an existing sensor which is incorporated with, or built into, the object, system or environment. The first temperature sensor may be embedded into, or mounted on or adjacent to, a wall of a chamber of a heating and/or cooling apparatus.

The method may comprise measuring a second temperature of the object, system or environment using a second temperature sensor located at a second position at or around the first time.

The method may comprise selecting the second position of the second sensor at a position relative to the object, system or environment at which accurate temperature control of the object, system or environment is desirable or critical. The method may comprise selecting the second position of the second sensor at a central position within a chamber of a heating and/or cooling apparatus.

The method may comprise determining a temperature offset or difference between the first and second temperatures.

The method may comprise measuring a third temperature of the object, system or environment using one of the first and second temperature sensors at a second time. For example, the method may comprise measuring a third temperature of the object, system or environment using the first temperature sensor at the second time.

The method may comprise using the third temperature and the temperature difference to determine a temperature at the position of the other of the first and second temperature sensors at the second time. For example, the method may comprise using the third temperature and the temperature difference to determine a temperature at the position of the second temperature sensor at the second time.

The method may comprise removing the other of the first and second temperature sensors from the object, system or environment after determining the temperature difference. For example, the method may comprise removing the second temperature sensor from the object, system or environment after determining the temperature difference. Such a method may be used to "calibrate" the first temperature sensor to allow the temperature at the position of the second temperature sensor to be accurately deduced or inferred from a measurement performed using the first temperature sensor. Such a method does not require the second temperature sensor to remain in place once calibration is complete.

The method may comprise repeatedly measuring a third temperature of the object, system or environment using one of the first and second temperature sensors. For example, the method may comprise repeatedly measuring a third temperature of the object, system or environment using the first temperature sensor.

The method may comprise using the third temperature and the temperature difference to repeatedly determine a temperature at the position of the other of the first and second temperature sensors. For example, the method may comprise using the third temperature and the temperature difference to repeatedly determine a temperature at the position of the second temperature sensor.

The method may comprise heating and/or cooling the object, the system or environment until the determined temperature at the position of the other of the first and second temperature sensors reaches a predetermined temperature. For example, the method may comprise heating and/or cooling the object, the system or environment until the determined temperature at the position of the second temperature sensor reaches a predetermined temperature.

The method may comprise measuring a plurality of further temperatures of the object, system or environment using a plurality of further temperature sensors at or around the first time, the plurality of further temperature sensors being located at a corresponding plurality of further positions.

The method may comprise determining a plurality of temperature offsets or differences, each temperature offset or difference being determined between the first temperature and a different one of the further temperatures.

The method may comprise measuring a third temperature of the object, system or environment using the first temperature sensor at a second time.

The method may comprise using the third temperature and each of the temperature differences to determine a temperature at the plurality of further positions.

The method may comprise determining an average of the temperatures determined at the plurality of further positions.

It should be understood that one or more features of one aspect may apply alone or in any combination to any other aspect.

According to an aspect of the present invention there is provided a method for use in, or when used in, temperature control or a method of temperature control.

The method may comprise associating a first setting of an adjustable device with a first temperature signal value.

The method may comprise associating a second setting of the adjustable device with a second temperature signal value.

The method may comprise determining a set-point temperature signal value from a set-point setting of the adjustable device, the first and second settings of the adjustable device, and the first and second temperature signal values.

The first temperature signal value may be associated with a first temperature. The method may comprise using a temperature sensor to measure the first temperature signal value. Alternatively, the method may comprise using an electrical source such as an electrical voltage source to provide the first temperature signal value. The method may comprise using an electrical source to provide a first temperature signal value equivalent to the first temperature signal value that would have been measured by the temperature sensor at the first temperature.

The second temperature signal value may be associated with a second temperature. The method may comprise using the temperature sensor to measure the second temperature signal value. Alternatively, the method may comprise using an electrical source such as an electrical voltage source to provide the second temperature signal value. The method may comprise using an electrical source to provide a second temperature signal value equivalent to the second temperature signal value that would have been measured by the temperature sensor at the second temperature.

It should be understood that one or more features of one aspect may apply alone or in any combination to any other aspect.

According to an aspect of the present invention there is provided an apparatus for use in, or when used in, temperature control. The apparatus may be a temperature control apparatus.

The apparatus may comprise an adjustable device.

The apparatus may comprise a processor configured for communication with the adjustable device.

The apparatus may comprise a temperature sensor.

The processor may be configured to:
associate a first setting of the adjustable device with a first temperature signal value;
associate a second setting of the adjustable device with a second temperature signal value; and
determine a set-point temperature signal value from a set-point setting of the adjustable device, the first and second settings of the adjustable device, and the first and second temperature signal values.

It should be understood that one or more features of one aspect may apply alone or in any combination to any other aspect.

BRIEF DESCRIPTION OF THE DRAWINGS

The present invention will now be described by way of non-limiting example only with reference to the following figures of which.

DETAILED DESCRIPTION OF THE DRAWINGS

Figure 1:
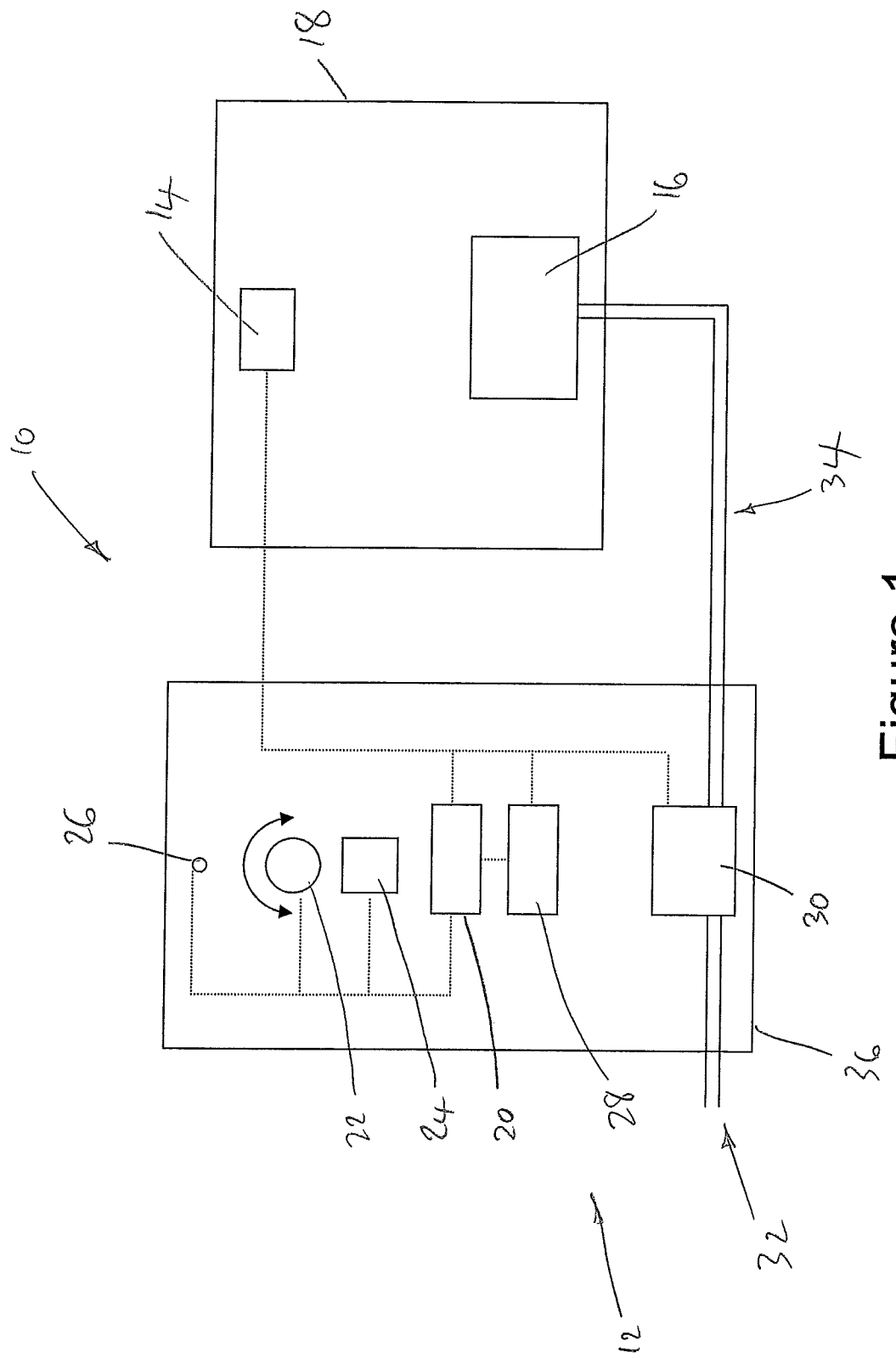
FIG. 1 shows a temperature control system including an apparatus for use in temperature control, a temperature sensor, and a plant for heating and/or cooling an object, system or environment to which the temperature sensor is exposed.

Referring initially to FIG. 1, there is shown a temperature control system generally designated 10 comprising an apparatus for use in temperature control in the form of a temperature controller generally designated 12, a temperature sensor in the form of a Type K thermocouple 14, and a plant in the form of a heating element 16 located within an oven 18.

The temperature controller 12 comprises a processor 20, an adjustable device in the form of a potentiometer 22, a binary control device in the form of a button 24 and a visual indicator in the form of a light emitting diode (LED) 26. The temperature controller 12 further comprises a memory 28 and a power switching device in the form of a relay 30. An input of the relay 30 is connected to a power input cable 32 and an output of the relay 30 is connected to the heating element 16 of the oven 18 by a power output cable 34. The temperature controller 12 further comprises an enclosure 36 for housing the processor 20, the potentiometer 22, the button 24, the LED 26, the memory 28 and the relay 30.

The temperature controller 12 is supplied with power via the power input cable 32. In other embodiments, the temperature controller 12 may comprise a power source such as a battery.

As indicated by the dotted lines in FIG. 1, the thermocouple 14, the relay 30, the potentiometer 22, the button 24, the LED 26 and the memory 28 are all configured for communication with the processor 20 of the temperature controller 12. Before the temperature controller 12 is used to control the temperature of the oven 18, the temperature controller 12 must first be programmed to define minimum and maximum set-point temperatures as will now be described with reference to FIG. 1 and FIG. 2.

To programme the minimum set-point temperature, a user first rotates the potentiometer 22 fully counter-clockwise and presses the button 24 for a first time. In response to the first operation of the button 24, the processor 20 determines a first potentiometer setting in the form of a voltage value $P_1$ representative of the fully counter-clockwise setting of the potentiometer 22 and stores $P_1$ in the memory 28. The processor 20 then causes the LED 26 to flash green to indicate that further user input is required. The user presses the button 24 for a second time. In response to the second operation of the button 24, the processor 20 switches the relay 30 so as to provide an electrical path through the relay 30 from the power input cable 32 to the power output cable 34 thereby supplying power to the heating element 16 of the oven 18 and causing the oven 18 to heat up. Whilst the relay 30 provides the electrical path from the power input cable 32 to the power output cable 34, the processor 20 operates the LED 26 so as to emit a constant red light to indicate that the relay 30 is providing power to the heating element 16 of the oven 18.

Once the oven 18 has reached a desired minimum set-point temperature, the user presses the button 24 for a third time. In response to the third operation of the button 24, the processor 20 samples a voltage signal received from the thermocouple 14 to provide a first temperature signal value in the form of a sampled voltage value $T_1$ which is representative of the minimum set-point temperature, and the processor 20 stores $T_1$ in association with the voltage value $P_1$ representative of the fully counter-clockwise setting of the potentiometer 22 in the memory 28. The processor 20 then switches the relay 30 so as to break the electrical path through the relay 30 from the power input cable 32 to the power output cable 34 and switches off the LED 26.

To programme the maximum set-point temperature, a user first rotates the potentiometer 22 fully clockwise and presses the button 24 for a fourth time. In response to the fourth operation of the button 24, the processor 20 determines a second potentiometer setting in the form of a voltage value $P_2$ representative of the fully clockwise setting of the potentiometer 22 and stores $P_2$ in the memory 28. At the same time, the processor 20 causes the LED 26 to flash green to indicate that further user input is required. The user presses the button 24 for a fifth time. In response to the fifth operation of the button 24, the processor 20 switches the relay 30 so as to re-establish the electrical path through the relay 30 from the power input cable 32 to the power output cable 34 thereby supplying power to the heating element 16 of the oven 18 and causing the oven 18 to continue heating up. Whilst the relay 30 provides the electrical path from the power input cable 32 to the power output cable 34, the processor 20 operates the LED 26 so as to emit a constant red light to indicate that the relay 30 is providing power to the heating element 16 of the oven 18.

Once the oven 18 has reached a desired maximum set-point temperature, the user presses the button 24 for a sixth time. In response to the sixth operation of the button 24, the processor 20 samples the voltage signal received from the thermocouple 14 to provide a second temperature signal value in the form of a sampled voltage value $T_2$ which is representative of the maximum set-point temperature and the processor 20 stores $T_2$ in association with the voltage value $P_2$ representative of the fully clockwise setting of the potentiometer 22 in the memory 28. The processor 20 then switches the relay 30 so as to break the electrical path through the relay 30 from the power input cable 32 to the power output cable 34 and switches off the LED 26.

The minimum and maximum set-point temperatures define a temperature range over which the temperature of the oven 18 is to be controlled. The minimum and maximum set-point temperatures may allow the user to choose the temperature range over which the oven 18 is to be controlled within an operating temperature range of the thermocouple 14. The minimum and maximum set-point temperatures may, for example, allow the user to choose the temperature range over which the oven 18 is to be controlled within a maximum operating temperature range of the thermocouple 14.

Figure 2:
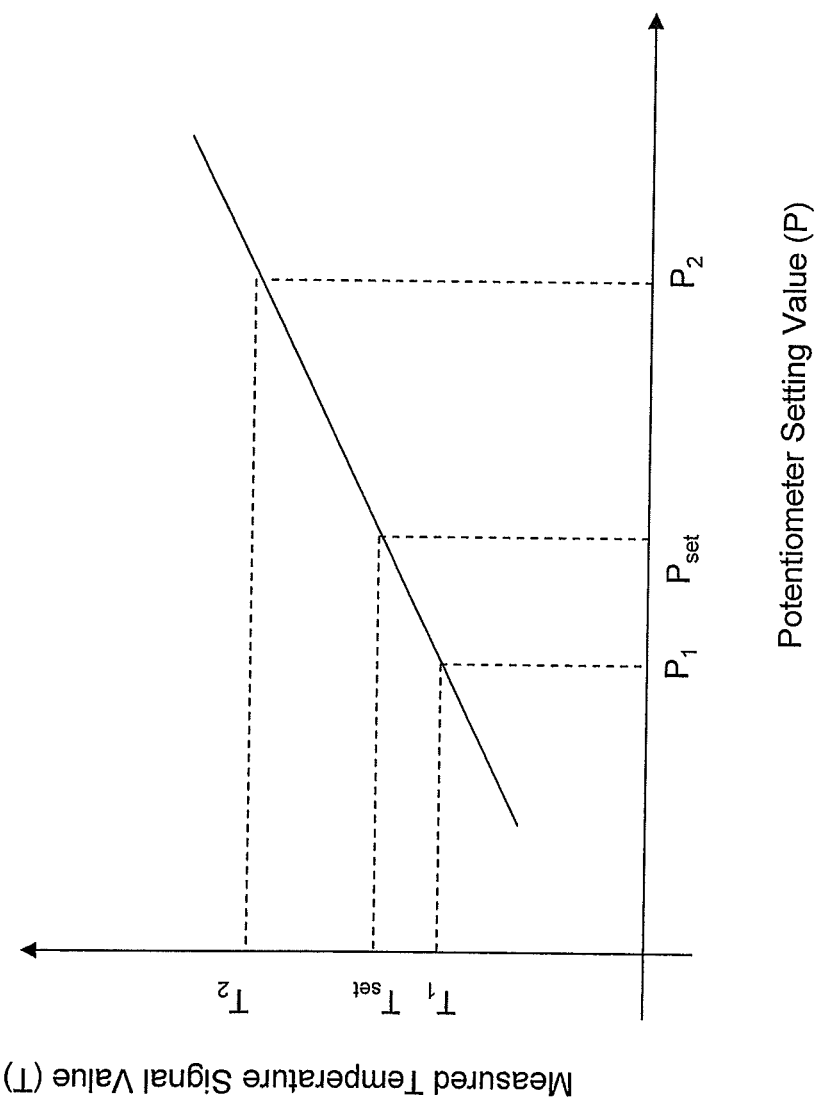
FIG. 2 illustrates a method for use in temperature control.

The potentiometer 22 is subsequently rotated to a position corresponding to a desired set-point temperature and, in response to a further operation of the button 24, the processor 20 determines a voltage value $P_{set}$ representative of the selected position of the potentiometer 22. As shown in FIG. 2, the processor 20 then uses linear interpolation to determine a set-point temperature signal value in the form of a voltage value $T_{set}$ which corresponds to the selected potentiometer position from $P_{set}$, $P_1$, $P_2$, $T_1$ and $T_2$. The processor 20 subsequently enters a control mode in which it switches the relay 30 so as to control the supply of power to the heating element 16 using proportional, integral and/or derivative control until the temperature signal value measured by the thermocouple 14 reaches the set-point temperature signal value $T_{set}$. Whilst in the control mode, the processor 20 causes the LED 26 to emit a constant amber light. Subsequent operations of the button 24 will toggle the processor 20 between the control mode and a non-control mode in which the processor switches the relay 30 so as to break the electrical path through the relay 30 from the power input cable 32 to the power output cable 34 and switches off the LED 26.

One skilled in the art will understand that the temperature controller 12 may be reprogrammed so as to re-define the temperature range over which the temperature of the oven 18 is to be controlled so as to at least partially reduce the effects of temperature sensor drift. Additionally or alternatively, the temperature controller 12 may be used to re-define the temperature range over which the temperature of the oven 18 is to be controlled according to the particular application for which the oven 18 is to be used.

Figure 3:
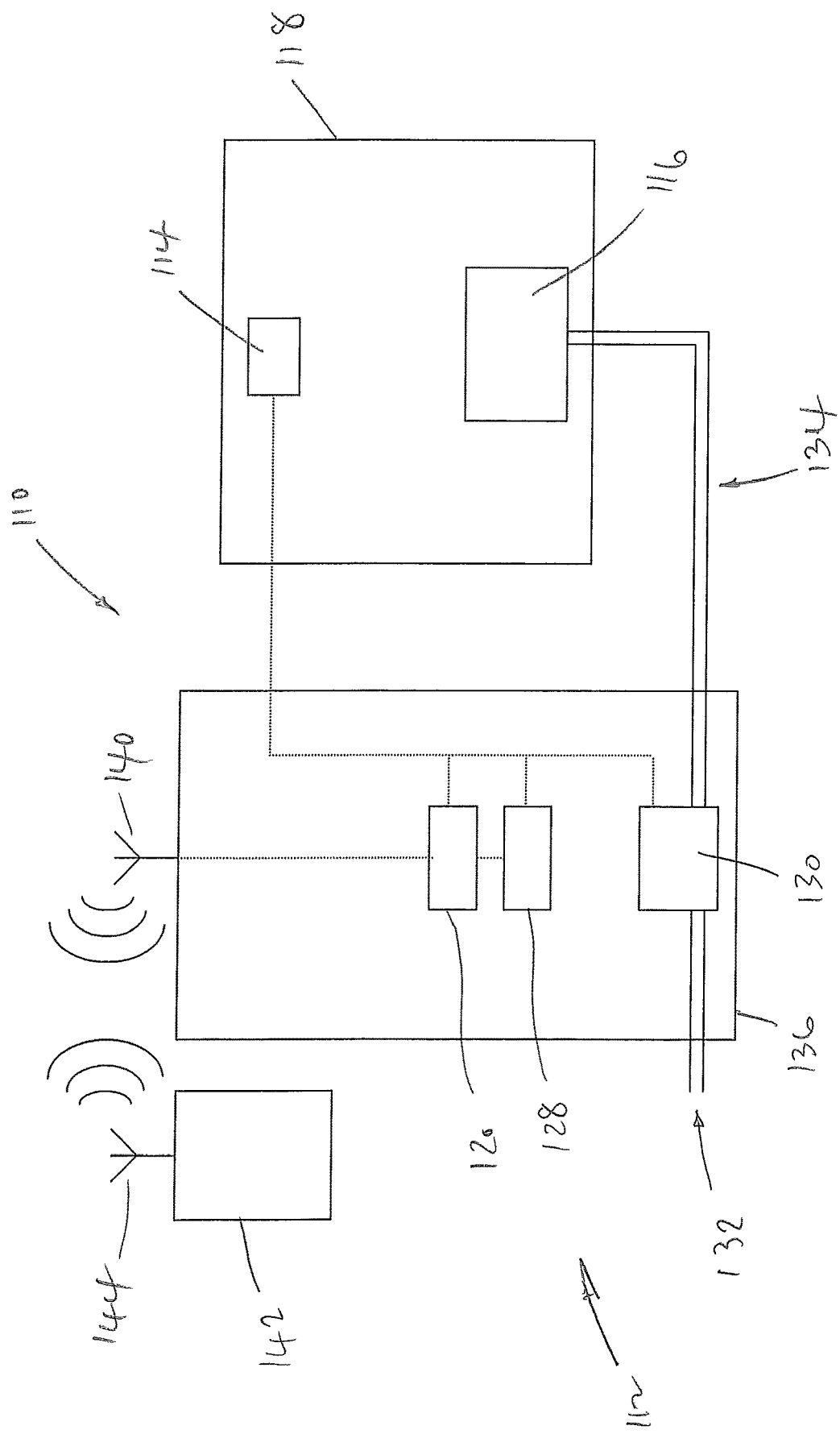
FIG. 3 shows an alternative temperature control system including an alternative apparatus for use in temperature control, a temperature sensor, and a plant for heating and/or cooling an object, system or environment to which the temperature sensor is exposed.

FIG. 3 shows an alternative temperature control system generally designated 110 comprising a temperature controller generally designated 112, a temperature sensor in the form of a Type K thermocouple 114, and a plant in the form of a heating element 116 located within an oven 118.

The temperature controller 112 comprises a processor 120, a memory 128 and a power switching device in the form of a relay 130. An input of the relay 130 is connected to a power input cable 132 and an output of the relay 130 is connected to the heating element 116 of the oven 118 by a power output cable 134. The temperature controller 112 further comprises an enclosure 136 for housing the processor 120, the memory 128, and the relay 130.

The temperature controller 112 is supplied with power via the power input cable 132. In other embodiments, the temperature controller 112 may comprise a power source such as a battery.

Unlike the temperature controller 12 of FIG. 1, the temperature controller 112 of FIG. 3 comprises an antenna 140 for wireless communication with a remote device 142 such as a portable computer (PC), a smart phone or the like having an antenna 144. As indicated by the dotted lines in FIG. 3, the thermocouple 114, the memory 128, the relay 130 and the antenna 140 are configured for communication with the processor 120.

The method of operation of the temperature controller 112 of FIG. 3 closely resembles that described above for the temperature controller 12 of FIG. 1 and only differs in that the remote device 142 performs the same functions of the potentiometer 22, the button 24, and the LED 26. The remote device 142 may have one or more data input devices and/or one or more data output devices to permit remote programming of the temperature controller 112. For example, the remote device 142 may comprise at least one of a switch, a potentiometer, an encoder, a dial, a slider, a keyboard, a touch screen or the like for this purpose. The remote device 142 may have at least one indicator or display device such as an LED, a display or the like.

Figure 4:
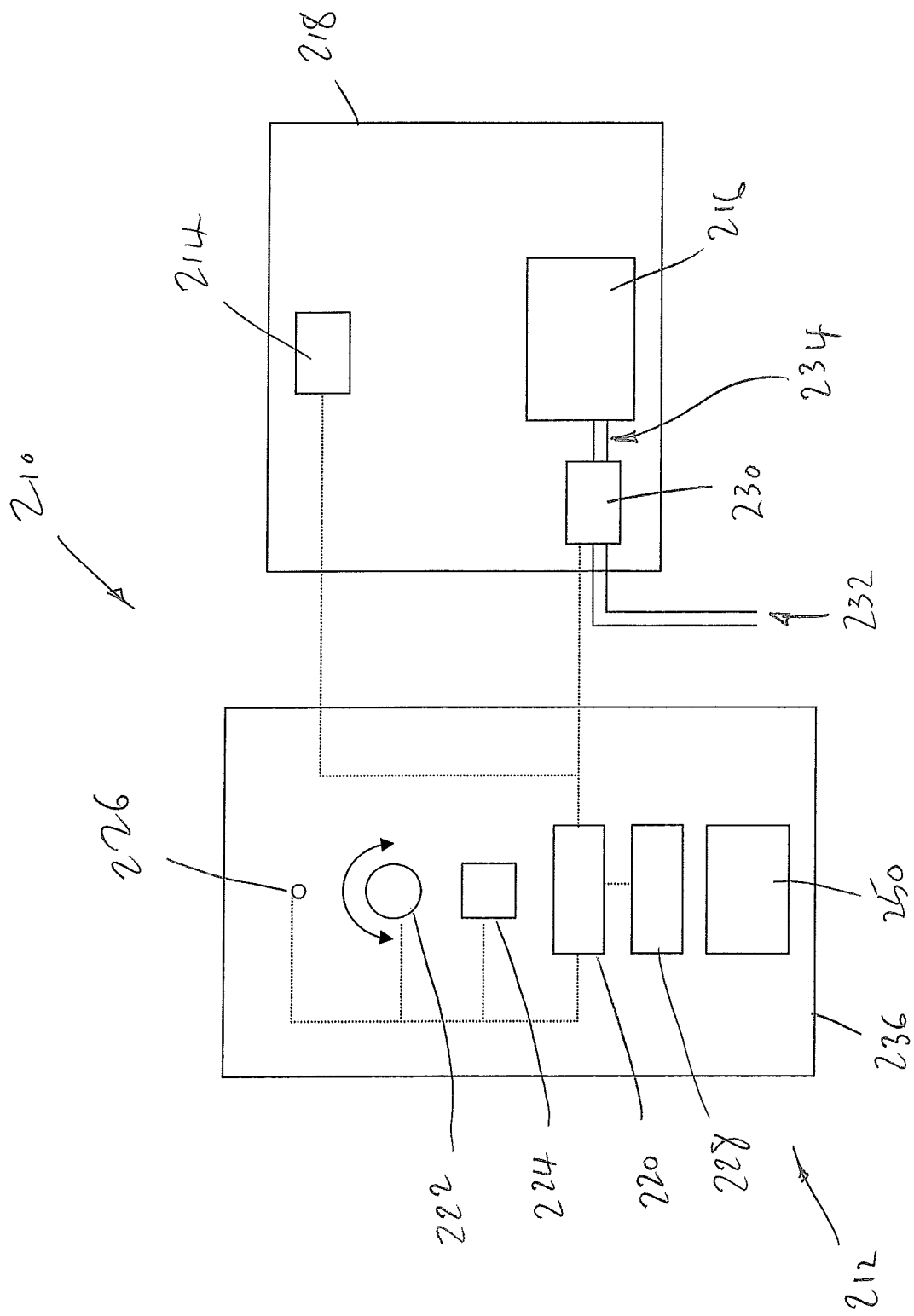
FIG. 4 shows a further alternative temperature control system including a further alternative apparatus for use in temperature control, a temperature sensor, and a plant for heating and/or cooling an object, system or environment to which the temperature sensor is exposed.

FIG. 4 shows a further alternative temperature control system generally designated 210 comprising a temperature controller generally designated 212, a temperature sensor in the form of a Type K thermocouple 214, and a plant in the form of a heating element 216 located within an oven 218. Unlike the oven 18 of the temperature control system 10 of FIG. 1, the oven 218 of the temperature control system 210 of FIG. 4 includes a power switching device in the form of a relay 230 for controlling the supply of power from a power input cable 232 to the heating element 216 via a power output cable 234.

The temperature controller 212 comprises a processor 220, an adjustable device in the form of a potentiometer 222, a binary control device in the form of a button 224 and a visual indicator in the form of a light emitting diode (LED) 226. The temperature controller 212 further comprises a memory 228. Unlike the temperature controller 12 of FIG. 1, the temperature controller 212 comprises a battery 250 which provides power for the operation of the temperature controller 212. The temperature controller 212 further comprises an enclosure 236 for housing the processor 220, the potentiometer 222, the button 224, the LED 226, the memory 228 and the battery 250.

As indicated by the dotted lines in FIG. 4, the thermocouple 214, the relay 230, the potentiometer 222, the button 224, the LED 226 and the memory 228 are all configured for communication with the processor 220 of the temperature controller 212. One skilled in the art will understand that the operation of the temperature control system 210 of FIG. 4 is generally similar to the operation of the temperature control system 10 of FIG. 1.

Figure 5:
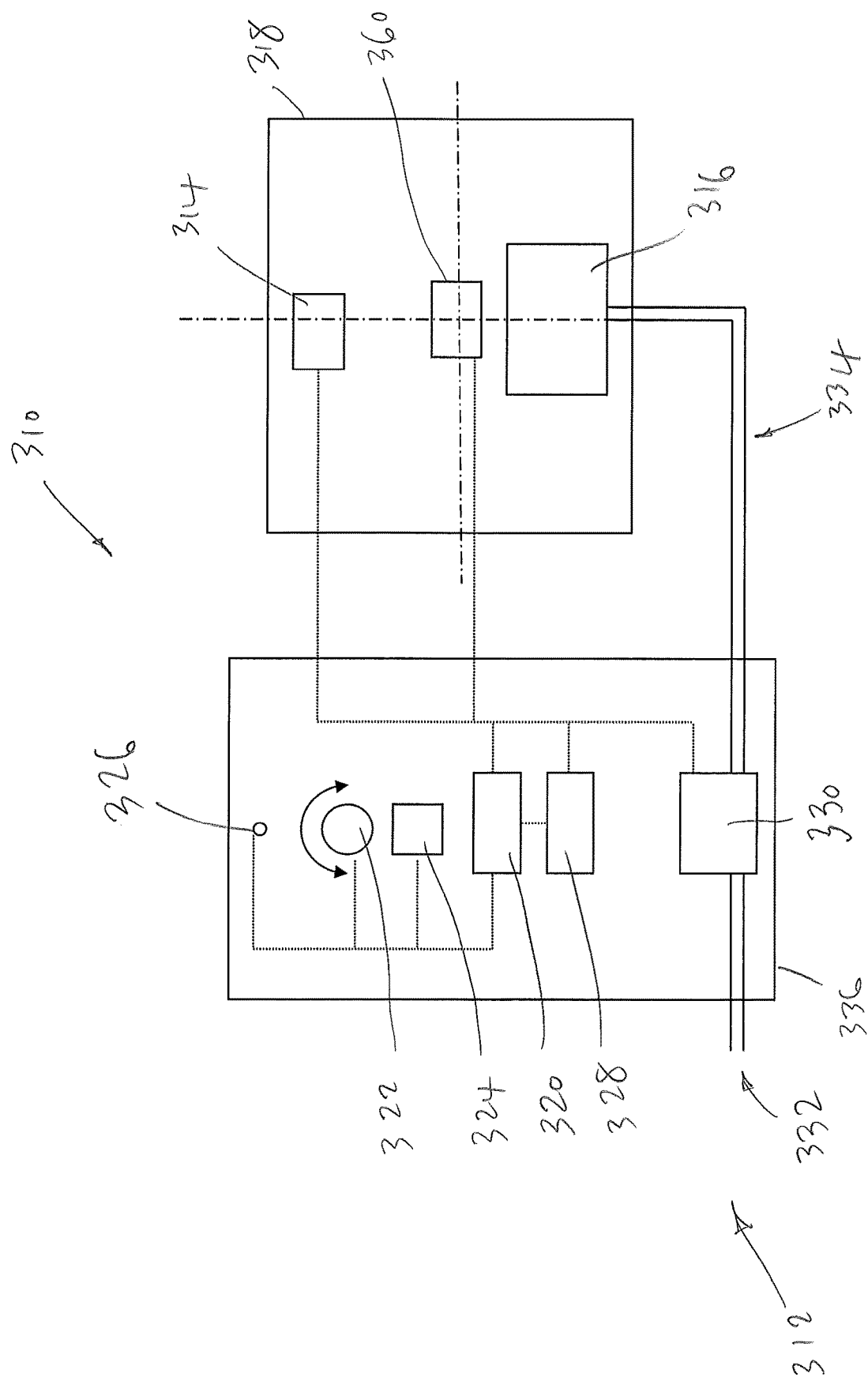
FIG. 5 shows a yet further alternative temperature control system.

Referring FIG. 5, there is shown a further temperature control system generally designated 310. The temperature control system 310 of FIG. 5 shares many like features with the temperature control system 10 of FIG. 1 and, as such, like features share like reference numerals. The temperature control system 310 comprises a temperature controller generally designated 312, a temperature sensor in the form of a Type K thermocouple 314, and a plant in the form of a heating element 316 located within an oven 318. The temperature control system 310 further comprises a further temperature sensor in the form of a further Type K thermocouple 360 located at the centre of the oven 318. The thermocouple 360 may be retro-fitted at the centre of the oven 318.

The temperature controller 312 comprises a processor 320, an adjustable device in the form of a potentiometer 322, a binary control device in the form of a button 324 and a visual indicator in the form of a light emitting diode (LED) 326. The temperature controller 312 further comprises a memory 328 and a power switching device in the form of a relay 330. An input of the relay 330 is connected to a power input cable 332 and an output of the relay 330 is connected to the heating element 316 of the oven 318 by a power output cable 334. The temperature controller 312 further comprises an enclosure 336 for housing the processor 320, the potentiometer 322, the button 324, the LED 326, the memory 328 and the relay 330.

As indicated by the dotted lines in FIG. 5, the thermocouples 314, 360 the relay 330, the potentiometer 322, the button 324, the LED 326 and the memory 328 are all configured for communication with the processor 320 of the temperature controller 312.

The thermocouple 360 may be used to accurately measure a temperature at the centre of the oven 318. The processor 320 may operate the relay 330 to heat or cool the oven 318 according to the temperature measured by the thermocouple 360. This may ensure that the temperature at the centre of the oven 318 is controlled accurately. This may be important when the temperature of the centre of the oven 318 is critical, but where the thermocouple 314 is embedded or attached during manufacture of the oven 318 into a wall of the oven 318.

Additionally or alternatively, the thermocouple 360 may be used to calibrate the thermocouple 314. Once calibration is complete, the thermocouple 360 may be removed or disabled. More specifically, or around a first time, the thermocouple 314 is used to measure a first temperature and the thermocouple 360 is used to measure a second temperature. The processor 320 determines and a temperature offset or difference between the first and second temperatures. The processor 320 stores the temperature difference in the memory 328. At a subsequent second time, the thermocouple 314 measures a third temperature and the processor 320 applies the stored temperature difference to the third temperature to thereby infer the temperature at the centre of the oven 318. The processor 320 may determine the temperature offset or difference at a predetermined temperature sensed by one of the thermocouples 314, 360. Such a method may be used to accurately control temperature at the centre of the oven 318 even where the existing thermocouple 314 is incorporated into a wall of the oven.

In a variant of the method of use of the further temperature control system 310 described above, the processor 320 may determine the temperature offset or difference at each of a plurality of predetermined temperatures sensed by the thermocouple 314. Each of the predetermined temperatures and the corresponding temperature offsets or differences may be stored in the memory 328 and used to more accurately determine the temperature at the centre of the oven 318 when the thermocouple 314 is used to measure temperature. Such a method may be used to more accurately control temperature at the centre of the oven 318 even where the existing thermocouple 314 is incorporated into a wall of the oven.

One skilled in the art will appreciate that various modifications of the foregoing temperature control systems 10, 110, 210 and methods may be made without departing from the scope of the present invention as defined by the claims. For example, the temperature control systems 10, 110, 210 may be used in conjunction with a calibrated temperature sensor (not shown) which is separate from the thermocouples 14, 114, 214. The calibrated temperature sensor may provide absolute temperature readings which may be associated with the voltage signal values $T_1$ and $T_2$ obtained by sampling signals received from the thermocouples 14, 114, 214. Alternatively, absolute temperature readings corresponding to the voltage signal values $T_1$ and $T_2$ may be obtained from calibration data specific to the particular thermocouple used or specific to the particular type of thermocouple used.

Although the temperature controllers 12, 112, 212 are shown as being located externally adjacent to the ovens 18, 118, 218, it should be understood that the temperature controllers 12, 112, 212 may be located internally within the ovens 18, 118, 218 or remotely from the ovens 18, 118, 218.

Rather than using linear interpolation to determine the set-point temperature signal value $T_{set}$, any interpolation method may be used to determine the set-point temperature signal value $T_{set}$ from $P_{set}$, $P_1$, $P_2$, $T_1$ and $T_2$. For example, known polynomial or spline interpolation methods may be used.

The foregoing temperature control systems 10, 110, 210 and methods may be used with any kind of temperature sensor. For example, the foregoing temperature control systems 10, 110, 210 and methods may be used with at least one of a thermometer, a thermocouple, a resistance temperature detector (RTD), a thermistor, a pyrometer or the like.

A power switching device other than a relay may be used. For example, a solid state switch such as a power transistor or the like may be used.

Although the temperature controllers 12, 112, 212 have been described for use in controlling the temperature of ovens 18, 118, 218 the temperature controllers 12, 112, 212 may be used for the temperature control of any object, system or environment. The temperature controllers 12, 112, 212 may, for example, be used for controlling the temperature of a heating or cooling system of any kind. The temperature controllers 12, 112, 212 may be used for controlling the temperature of a system or appliance for warming, grilling or cooking food. The temperature controllers 12, 112, 212 may be used for controlling the temperature of a system or appliance for cooling such as a fridge, a freezer or the like. The temperature controllers 12, 112, 212 may be used for controlling the temperature of a system or environment across a broad temperature range from cryogenic temperatures to temperatures present in a furnace or a jet engine or the like.

Furthermore, each of the temperature controllers 12, 112, 212 may be programmed for use with multiple temperature sensors. For example, the temperature controller 12 may be programmed to operate with multiple temperature sensors, where each temperature sensor is used to sense the temperature of a different object, to sense the temperature in a different environment or zone, or to sense the temperature of a different system or component. The temperature controller 12 may be programmed to define different temperature control ranges for different objects, to define different temperature control ranges in different environments or zones, or to define different temperature ranges for different systems or components.

Additionally or alternatively, each of the temperature controllers 12, 112, 212 may be programmed for use with a single temperature sensor over multiple temperature control ranges. For example, the temperature controller 12 may be programmed to operate over multiple temperature control ranges, where each temperature control range corresponds to a different application or use of the oven 18. One skilled in the art will appreciate that the method described for programming or defining a single temperature control range may be extended so as to define multiple temperature control ranges which are stored in the memory 28 and which may be selected by a user according to a desired application or use of the oven 18.

Rather than physically changing the temperature of the environment in which a temperature sensor 14, 114, 214 is located to permit programming of the minimum or maximum set-point temperature, a voltage source may be used to provide an equivalent voltage value to the controller 20, 120, 220 which is equivalent to the voltage $T_1$ or $T_2$ that would have been provided by the temperature sensor 14, 114, 214 at the desired minimum or maximum set-point temperature. The equivalent voltage value corresponding to a given temperature may be determined from calibration data for the specific temperature sensor used or for the specific kind of temperature sensor used.

The invention claimed is:

1. A method for use in temperature control, comprising performing sequentially the steps of:
    (i) measuring a first temperature of an object, a system or an environment using a first temperature sensor located at a first position at a first time, and measuring a second temperature of the object, the system or the environment using a second temperature sensor located at a second position at the first time;
    (ii) determining a temperature difference between the first and the second temperatures to produce a determined temperature difference;
    (iii) removing the second temperature sensor from the object, the system, or the environment;
    (iv) measuring a third temperature of the object, the system or the environment using the first temperature sensor at a second time, without the second temperature sensor within the object, system or environment;
    (v) using the third temperature and the determined temperature difference to determine an inferred temperature at the second position at the second time;
    wherein the determined temperature at the second position at the second time is used for controlling a plant for heating and/or cooling the object, system or environment until the inferred temperature at the second position reaches a desired temperature.

2. The method of claim 1, further comprising:
    repeatedly measuring a temperature of the object, the system, or the environment using the first temperature sensor to produce repeatedly measured temperatures;
    using the repeatedly measured temperatures and the determined temperature difference to repeatedly determine a temperature at the position of the second temperature sensor;
    heating or cooling the object, the system, or the environment until the temperature at the position of the second temperature sensor reaches a predetermined temperature.

3. The method of claim 1, further comprising determining a temperature difference between a temperature measured using the first temperature sensor and the temperature measured at the same time using the second temperature sensor for each of a plurality of predetermined temperatures.

4. The method of claim 3, further comprising storing each temperature difference together with the corresponding temperatures measured using the first temperature sensor and optionally using interpolation to determine the temperature at the second position.

5. A system comprising a temperature controller comprising:
    a first temperature sensor for measuring a first temperature at a first position of the system;
    a removable second temperature sensor for measuring a second temperature at a second position of the system;
    a processor for determining a temperature difference between the first and second temperatures;
    the processor adapted to determine an inferred temperature at the second position from a measurement of a third temperature at the first position when the second temperature sensor is removed.

6. The A method for use in temperature control comprising:
    associating a minimum setting of an adjustable device with a first temperature signal value;
    associating a maximum setting of the adjustable device with a second temperature signal value;
    determining a set-point temperature signal value from a set-point setting of the adjustable device, the minimum and maximum settings of the adjustable device, and the first and second temperature signal values; wherein the first temperature signal value defines a minimum set-point temperature and the second temperature signal value defines a maximum set-point temperature; wherein the minimum setting, the maximum setting and the set-point setting are used for controlling a plant for heating and/or cooling an apparatus, system or environment and wherein the minimum and maximum settings of the adjustable device correspond to operational limits of the adjustable device;

using a first temperature sensor to measure the first temperature signal value when the first temperature sensor is at a first temperature. using the first temperature sensor to measure the second temperature signal value when the first temperature sensor is at a second temperature; wherein the first temperature sensor is located at a first position relative to an object, a system, or an environment;

locating a second temperature sensor at a second position different from the first position;

determining a temperature difference between a temperature measured using the first temperature sensor and a temperature measured at a same time using the second temperature sensor;

storing the temperature difference to create a stored temperature difference;

measuring a third temperature using the first temperature sensor;

using the third temperature and the stored temperature difference to determine a temperature at the second position; and removing the second temperature sensor from the object, the system, or the environment after determining the temperature difference.

* * * * *